United States Patent
Kukreja et al.

(10) Patent No.: US 10,689,554 B2
(45) Date of Patent: Jun. 23, 2020

(54) GLUE COMPOSITIONS AND METHODS

(71) Applicant: Sanford, L.P., Atlanta, GA (US)

(72) Inventors: Joginder Kukreja, Brooklin (CA); Van R. Foster, Westerville, OH (US)

(73) Assignee: Sanford, L.P., Atlanta, GA (US)

( * ) Notice: Subject to any disclaimer, the term of this patent is extended or adjusted under 35 U.S.C. 154(b) by 147 days.

(21) Appl. No.: 15/577,039

(22) PCT Filed: May 27, 2016

(86) PCT No.: PCT/US2016/034572
§ 371 (c)(1),
(2) Date: Nov. 27, 2017

(87) PCT Pub. No.: WO2016/196262
PCT Pub. Date: Dec. 8, 2016

(65) Prior Publication Data
US 2018/0134935 A1  May 17, 2018

Related U.S. Application Data

(60) Provisional application No. 62/167,984, filed on May 29, 2015.

(51) Int. Cl.
| | |
|---|---|
| *C09J 191/06* | (2006.01) |
| *C09J 123/14* | (2006.01) |
| *C09J 9/00* | (2006.01) |
| *C08L 91/06* | (2006.01) |
| *C08K 5/5419* | (2006.01) |
| *C08K 9/10* | (2006.01) |
| *C08L 93/04* | (2006.01) |
| *C08K 5/00* | (2006.01) |
| *B29C 39/00* | (2006.01) |
| *B29K 23/00* | (2006.01) |
| *B29K 105/00* | (2006.01) |

(52) U.S. Cl.
CPC ........... *C09J 191/06* (2013.01); *C08K 5/0016* (2013.01); *C08K 5/5419* (2013.01); *C08K 9/10* (2013.01); *C08L 91/06* (2013.01); *C08L 93/04* (2013.01); *C09J 9/005* (2013.01); *C09J 123/14* (2013.01); *B29C 39/003* (2013.01); *B29K 2023/14* (2013.01); *B29K 2105/0014* (2013.01); *B29K 2105/0038* (2013.01); *B29K 2105/0097* (2013.01); *C08L 2314/06* (2013.01)

(58) Field of Classification Search
CPC ........ C09J 191/06; C09J 9/005; C09J 123/14; B29C 39/003
See application file for complete search history.

(56) References Cited

U.S. PATENT DOCUMENTS

| | | | |
|---|---|---|---|
| 6,084,010 A * | 7/2000 | Baetzold | C09J 9/005 523/205 |
| 6,136,119 A | 10/2000 | Columbus et al. | |
| 8,652,996 B2 | 2/2014 | Kwan | |
| 2008/0021186 A1* | 1/2008 | Steib | C08F 10/00 526/348.3 |
| 2014/0358100 A1 | 12/2014 | Remmers et al. | |

FOREIGN PATENT DOCUMENTS

| | | |
|---|---|---|
| EP | 0384264 A1 | 8/1990 |
| GB | 1 343 704 A * | 1/1974 |
| GB | 1343704 A | 1/1974 |

OTHER PUBLICATIONS

International Search Report and Written Opinion for International Application No. PCT/US2016/034572 dated Sep. 2, 2016 (9 pages).
"Foral AX-E Fully Hydrogenated Rosin Product Data Sheet" (Eastman Chemical Company), Jan. 2011 (3 pages).
Ren, Dakai et al., "Wood/adhesive interactions and the phase morphology of moisture-cure polyurethane wood adhesives," International Journal of Adhesion & Adhesives, vol. 34 (2012), pp. 55-61.

\* cited by examiner

*Primary Examiner* — Robert D Harlan
(74) *Attorney, Agent, or Firm* — Eversheds Sutherland (US) LLP

(57) ABSTRACT

Glue compositions and methods for their manufacture are provided. A glue composition contains a metallocene-catalyzed polyolefin wax present in an amount of at least 25 percent, by weight, and a tackifier present in an amount of at least 20 percent, by weight. The glue composition is solid at room temperature and is configured to provide an adhesive layer onto a substrate upon abrasion thereagainst.

22 Claims, No Drawings

GLUE COMPOSITIONS AND METHODS

CROSS-REFERENCE TO RELATED APPLICATIONS

The instant application is a U.S. national stage application claiming priority to International Application No. PCT/U2016/034572, filed May 27, 2016, which is an International Application claiming priority to U.S. Provisional Application No. 62/167,984, filed May 29, 2015, the disclosures of which are incorporated by reference herein in their entirety.

TECHNICAL FIELD

This disclosure relates in general to adhesive products and more specifically to solid glue compositions and methods of making the same.

BACKGROUND

When gluing materials such as construction paper, copy paper or other materials that are lightweight in nature, preformed glue sticks are commonly used. Such products provide relatively strong and quick bonding attachments. Although these products are viewed as being quick-drying formulas, they contain a high level of water that must evaporate before a final, dried bond is formed. Additionally, water-containing products can wrinkle delicate items such as paper. Furthermore, waterborne glue technology is dependent upon the relative humidity of the environment in which the glue is applied, with increased humidity further slowing down the complete drying time of waterborne products. Organic solvents are an option to eliminate paper wrinkling; however, such solvents have limited commercial applicability because they cannot be used in products for children. Hot melt glue sticks are also available, but likewise generally are not an option for children because of the high temperature required to apply the glue.

Thus, there is a need for a non-toxic, fast-drying glue stick that does not wrinkle or damage paper or other delicate substrates.

SUMMARY

In one aspect, a glue composition is provided, including a metallocene-catalyzed polyolefin wax present in an amount of at least 25 percent, by weight of the composition, a tackifier present in an amount of at least 20 percent, by weight of the composition, and at least one additive selected from a group consisting of plasticizers, lubricants, and mineral oils, wherein the glue composition is solid at room temperature and is configured to provide an adhesive layer onto a substrate upon abrasion thereagainst.

In another aspect, a method of making a glue composition is provided, including combining a metallocene-catalyzed polyolefin wax and a tackifier in a vessel, heating the vessel to a temperature of from about 100° C. to about 150° C. and mixing to form a homogenous mixture, and pouring the homogenous mixture into a mold and allowing it to cool to form a glue composition containing the metallocene-catalyzed polyolefin wax in an amount of at least 25 percent, by weight of the composition, and the tackifier in an amount of at least 20 percent, by weight of the composition, wherein the glue composition is solid at room temperature and is configured to provide an adhesive layer onto a substrate upon abrasion thereagainst.

DETAILED DESCRIPTION

Glue compositions and methods for their manufacture have been developed to address the above-described problems with existing glue stick technologies. In particular, glue compositions that are solid at room temperature, fast-drying, and which do not require a moisture-resistant container or cover have been developed. Glue sticks or other articles formed from these glue compositions advantageously do not require heat for their application other than the minimal heat produced from the friction between the glue composition and a substrate against which the composition is selectively abraded or rubbed, in order to apply a layer of the glue composition to the substrate.

As used herein, the phrase "solid at room temperature" refers to the glue composition having a structural rigidity such that it is substantially resistant to changes of shape or volume. That is, the glue compositions described herein are non-liquid and are generally resistant to flow at room temperature. The glue compositions described herein may be in the form a gel or have gel-like properties.

As used herein, all percentages refer to weight percent per the total composition weight, unless otherwise specified.

In some embodiments, the glue compositions described herein contain no solvents (e.g., water or organic solvents) or contain only encapsulated (e.g., microencapsulated) solvents, such that the glue composition is stable at room temperature and will not dry out. Such glue compositions advantageously may be packaged without a moisture-resistant container or cover. In certain embodiments, the glue compositions contain no water and therefore provide a fast-drying glue that does not wrinkle or damage paper or other delicate substrates.

In certain embodiments, the glue composition contains 100 percent solids. In certain embodiments, the glue composition is non-toxic.

Embodiments of glue compositions and methods of manufacturing the same will be described in more detail below.

Glue Compositions

In one aspect, a glue composition is provided that contains a metallocene-catalyzed polyolefin wax present in an amount of at least 25 percent, by weight of the composition, and a tackifier present in an amount of at least 20 percent, by weight of the composition, wherein the glue composition is solid at room temperature and is configured to provide an adhesive layer onto a substrate upon abrasion thereagainst. That is, the glue composition may be configured to deposit a layer having adhesive properties onto a substrate against which the composition is abraded (e.g., to which the composition is applied or contacted by rubbing or a similar application motion). In certain embodiments, the friction generated between the glue composition and a first substrate during application is sufficient to melt the composition to provide a layer having adhesive properties to which a second substrate may be applied, such that the first and second substrates are bonded to one another upon cooling of the layer of glue.

In certain embodiments, the metallocene-catalyzed polyolefin wax is present in an amount of from 25 percent to 45 percent, by weight of the composition. For example, the metallocene-catalyzed polyolefin wax may be present in an amount of from 26 percent to 36 percent, by weight of the composition. For example, the metallocene-catalyzed polyolefin wax may be formed from suitable polyolefins, such as thermoplastic polyolefins including polyethylene, polypropylene, polymethylpentene, polybutene-1, and combinations and copolymers thereof. In some embodiments, the metallocene-catalyzed polyolefin wax is a metallocene-catalyzed polypropylene wax. In some embodiments, the metallocene-catalyzed polyolefin wax is an amorphous metallocene propylene-ethylene-copolymer wax, such as LICOCENE PP 1602 (commercially available from Clariant, Switzerland).

As used herein, the term "tackifier" refers to any compound that increases the tack, or stickiness, of the adhesive layer formed by the glue composition when abraded against a substrate. In certain embodiments, the tackifier is present in an amount of from 20 percent to 75 percent, by weight of the composition. For example, the tackifier may be present in an amount of from 20 percent to 55 percent, by weight of the composition. For example, the tackifier may be present in an amount of from 20 percent to 40 percent, by weight of the composition. In certain embodiments, multiple tackifiers are contained in the glue formulation and have a combined weight percentage of at least 20 percent.

For example, the tackifier may be any suitable tackifier known in the art. In certain embodiments, the tackifier is a resin, such as rosins and their derivates, terpenes and modified terpenes, aliphatic, cycloaliphatic and aromatic resins (e.g., C5 aliphatic resins, C9 aromatic resins, and C5/C9 aliphatic/aromatic resins), hydrogenated hydrocarbon resins and their mixtures, terpene-phenol resins, and any combination thereof. In some embodiments, the tackifier includes a hydrogenated resin, a rosin ester, or a combination thereof. For example, the tackifier may include a hydrogenated dicyclopentadiene hydrocarbon resin, a hydrogenated polycyclopentadiene resin, a glycerol rosin ester, a pentaerythritol rosin ester, or a combination thereof.

In some embodiments, the tackifier includes a hydrogenated dicyclopentadiene (c9) hydrocarbon resin, such as SUKOREZ SU-100 (commercially available from Kolon Industries, South Korea). In some embodiments, the tackifier includes a partially hydrogenated rosin, such as STAY-BELITE RESIN-E (commercially available from Eastman Chemical Company, Tennessee). In some embodiments, the tackifier includes a hydrogenated polycyclopentadiene, such as KOBOGUARD 5400 (commercially available from Kobo Products, Inc., New Jersey). In some embodiments, the tackifier includes a glycerol rosin ester, such as NUROZ RE85E (commercially available from Newport Industries, United Kingdom). In some embodiments, the tackifier includes a pentaerythritol rosin ester, such as SYLVALITE RE 100 (commercially available from Arizona Chemical Company, Florida).

In some embodiments, the glue composition further includes at least one additive to provide the desired processing and handling properties. For example, suitable additives may include plasticizers, softeners, lubricants, adhesives, sealants, slip agents, and/or mineral oils. It should be understood that certain compounds may fall within the scope of more than one of these categories.

In certain embodiments, the glue composition includes a plasticizer to increase the plasticity or fluidity of the composition. Suitable plasticizers known in the art may be used, including dicarboxylic/tricarboxylic ester-based plasticizers, adipate-based plasticizers, sebacate-based plasticizers, maleate-based plasticizers, benzoate-based plasticizers, terephthalates, 1,2-Cyclohexane dicarboxylic acid diisononyl ester, epoxidized vegetable oils, alkyl sulphonic acid phenyl ester, sulfonamides, organophosphates, glycols/polyethers, and polybutene. In some embodiments, the glue composition includes a benzoate ester-type plasticizer, such as BENZOFLEX 352 (commercially available from Eastman Chemical Company). In some embodiments, the glue composition includes a hydrocarbon resin plasticizer, such as PICCOLASTIC A75 (commercially available from Eastman Chemical Company). In some embodiments, the plasticizer is present in the glue composition in an amount from 1 percent to 15 percent, by weight of the composition.

In certain embodiments, the glue composition includes a lubricant. Suitable lubricants known in the art may be used, including stearic acid, calcium stearate, glycerol monostearate, or a combination thereof. In some embodiments, the lubricant is present in the glue composition in an amount from 1 percent to 15 percent, by weight of the composition.

In certain embodiments, the glue composition includes a mineral oil, such as RENOIL 220 (commercially available from Renkert Oil, Pennsylvania). In some embodiments, the mineral oil is present in the glue composition in an amount from 1 percent to 5 percent, by weight of the composition. In certain embodiments, deodorized kerosene or isododecane may be used as an alternative to the mineral oil.

Thus, in certain embodiments, a glue composition at least contains a metallocene-catalyzed polyolefin wax, at least one tackifier, such as hydrogenated resins and/or rosin esters, a plasticizer, such as a benzoate ester-type plasticizer and/or hydrocarbon resin plasticizer, a lubricant, such as stearic acid, calcium stearate, and/or glycerol monostearate, and a mineral oil. In some embodiments, these components make up about 80 percent, or more, of the glue composition, by weight. Thus, in certain embodiments additional additives are also contained in the glue composition.

For example, the glue composition may further contain an inorganic moisture-curing adhesives or sealant (e.g., silicone technology), an organic adhesives or sealants (e.g., silylated polyether), a thermoplastic styrene-butadiene rubber (SBR), a polyvinylpyrrolidone polymer, or a combination thereof. Such additives may be present in the glue composition in an amount of 1 percent to 20 percent, by weight of the composition. For example, the moisture-curing elastomer adhesive or sealant may be a moisture-curing acetoxy silicone adhesive, which may be encapsulated. For example, the polyvinylpyrrolidone polymer may be PVP K-30 (commercially available from Ashland, Inc., Kentucky). For example, the thermoplastic styrene-butadiene rubber may be L-SBR-820 (commercially available from Kuraray, Japan).

For example, the glue composition may further contain a slip agent or processing aid, such as stearyl alcohol or isopropyl alcohol, a reinforcing material, such as a suitable filler like calcium carbonate, a light stabilizer/UV absorber, such as TINUVIN 328 (commercially available from BASF, Germany), and/or an antioxidant, such as a IRGANOX 1010 (commercially available from BASF).

For example, the glue composition may further contain one or more thermochromic materials configured to provide a visual indicator of application of the glue composition in response to the friction of application.

In certain embodiments, the glue compositions described herein contain 100 percent solids and contain no solvents, which beneficially provide a quick bonding adhesive (i.e., a drying or curing step is eliminated) without the use of water that causes paper wrinkling or an organic solvent which eliminates its use by children. Traditional hot melt glue sticks may also contain 100 percent solids; however, such formulations cannot be applied in a non-melted state due to lack of lubricity and lack of effective adhesive deposition onto a substrate. Additionally, such products are typically very firm and tear delicate surfaces when abraded thereon. In contrast, the present glue compositions may be applied in a non-melted state and readily deposited onto a substrate.

Moreover, the present glue compositions may be formulated to have suitable properties to achieve smooth application on delicate surfaces.

In other embodiments, the glue composition may contain all solids other than encapsulated components, such that the glue composition is stable at room temperature and will not dry out. In certain embodiments, at least one tackifier, the mineral oil, or both, are encapsulated. For example, at least one tackifier and a mineral oil (or a suitable alternative as discussed above) are encapsulated, such that an encapsulated composition contains mineral oil in an amount of from 5 percent to 30 percent, by weight of the encapsulated composition, and the at least one tackifier in an amount of from 70 percent to 95 percent, by weight of the encapsulated composition. In certain embodiments, the encapsulated composition contains at least 50 percent solids, by weight of the encapsulated composition. In some embodiments, the encapsulated composition contains from 50 percent solids to 75 percent solids, by weight of the encapsulated composition. In certain embodiments, the encapsulated composition includes a mineral oil in an amount from 10 to 30 percent, by weight of the composition, as a tackifier, such as hydrogenated polycyclopentadiene, in an amount of from 70 to 90 percent, by weight of the composition.

Thus, the present glue compositions were discovered to balance the necessary ease of application against the ability to provide a paper-tearing bond after application by utilizing a metallocene-catalyzed polymer as the primary polymer in the system. A combination of different additives such as oils, plasticizers, and resins provide enough tack to the formula to provide a good initial tack to surface which provides immediate bonding. A fatty acid may be included to provide the composition with better integrity when the product is applied. Various combinations of stearates and long chain organic alcohols may be included to provide lubricating properties.

One embodiment of a glue composition found to have the desired adhesion and application properties includes a metallocene-catalyzed polyolefin wax in an amount from 25 to 45 percent by weight (e.g., about 35 percent by weight), mineral oil in an amount from 1 to 5 percent by weight (e.g., about 3 percent by weight), one or more hydrogenated resin tackifiers in an amount from 35 to 50 percent by weight (e.g., 44 percent by weight), one or more lubricants in an amount from 1 to 10 percent by weight (e.g., 6 percent by weight), and one or more plasticizers in an amount from 5 to 15 percent by weight (e.g., 10 percent by weight).

In certain embodiments, a moisture-curing elastomeric adhesive or sealant is included in the formula. This material may be incorporated into the formula to provide improved lubricity when applying the composition and to provide a secondary adhesive cure after the initial attachment is formed. It is believed that the waxes used have a very low level of water attached to its service and any residual amounts are removed in the heating process when manufacturing the compositions, as will be discussed in greater detail below. When a moisture-curing elastomer is added to the composition, it is believed that the interior portion of the moisture-curing elastomeric portion of the formulation is protected. Sample products that were applied to paper were observed to remove the protected portion upon application of the glue stick, allowing the inherent tackiness of the composition to provide good initial paper-bonding tack and a final cure over time from the moisture-curing portion of the glue stick. The technology is found to be useful for both inorganic moisture-curing adhesives or sealants (e.g., silicone technology) and also organic adhesives or sealants (e.g., silylated polyether) adhesives or sealants.

Another aspect of the inclusion of a silicone adhesive is believed to be the potential reduction of separate glue sticks formed from the composition bonding together when stored in contact with each other. Incorporation of a silicone adhesive in the formulation seemingly provides adhesion benefits and also these surface coating benefits.

One embodiment of a glue composition using a moisture-curing acetoxy silicone adhesive includes a metallocene-catalyzed polyolefin wax in an amount from 25 to 35 percent by weight (e.g., about 30 percent by weight), mineral oil in an amount from 1 to 5 percent by weight (e.g., about 3 percent by weight), one or more hydrogenated resin tackifiers in an amount from 25 to 40 percent by weight (e.g., 35 percent by weight), one or more lubricants in an amount from 5 to 20 percent by weight (e.g., 12 percent by weight), one or more plasticizers in an amount from 5 to 15 percent by weight (e.g., 10 percent by weight), a slip agent in an amount from 1 to 5 percent by weight (e.g., 2 percent by weight), and the moisture-curing acetoxy silicone adhesive in an amount from 5 to 15 percent by weight (e.g., 10 percent by weight).

Another embodiment of a glue composition incorporates a polyvinylpyrrolidone polymer and includes a metallocene-catalyzed polyolefin wax in an amount from 25 to 35 percent by weight (e.g., about 30 percent by weight), mineral oil in an amount from 1 to 5 percent by weight (e.g., about 3 percent by weight), one or more hydrogenated resin tackifiers in an amount from 25 to 40 percent by weight (e.g., 35 percent by weight), one or more lubricants in an amount from 5 to 20 percent by weight (e.g., 12 percent by weight), one or more plasticizers in an amount from 5 to 15 percent by weight (e.g., 10 percent by weight), a slip agent in an amount from 1 to 5 percent by weight (e.g., 2 percent by weight), a moisture-curing acetoxy silicone adhesive in an amount from 1 to 10 percent by weight (e.g., 3 percent by weight), and the polyvinylpyrrolidone polymer in an amount of from 5 to 15 percent by weight (e.g., 8 percent by weight).

Another embodiment of a glue composition uses a thermoplastic SBR rubber instead of the moisture-curing adhesive or sealant, and includes a metallocene-catalyzed polyolefin wax in an amount from 25 to 35 percent by weight (e.g., about 28 percent by weight), mineral oil in an amount from 1 to 5 percent by weight (e.g., about 4 percent by weight), one or more hydrogenated resin tackifiers in an amount from 25 to 35 percent by weight (e.g., 30 percent by weight), one or more rosin ester tackifiers in an amount from 15 to 25 percent by weight (e.g., 20 percent by weight), one or more lubricants in an amount from 1 to 10 percent by weight (e.g., 5 percent by weight), one or more plasticizers in an amount from 1 to 10 percent by weight (e.g., 6 percent by weight), and a thermoplastic SBR rubber in an amount from 1 to 10 percent by weight (e.g., 5 percent by weight).

Another embodiment of a glue composition not containing a moisture-curing adhesive/sealant or a liquid styrene-butadiene elastomer can also be effectively made by employing a polyvinylpyrrolidone polymer, and includes a metallocene-catalyzed polyolefin wax in an amount from 25 to 35 percent by weight (e.g., about 30 percent by weight), mineral oil in an amount from 1 to 5 percent by weight (e.g., about 3 percent by weight), one or more hydrogenated resin tackifiers in an amount from 25 to 40 percent by weight (e.g., 33 percent by weight), one or more lubricants in an amount from 5 to 20 percent by weight (e.g., 12 percent by weight), one or more plasticizers in an amount from 5 to 15 percent by weight (e.g., 9 percent by weight), a slip agent in an amount from 1 to 5 percent by weight (e.g., 2 percent by weight), a polyvinylpyrrolidone polymer in an amount of from 5 to 15 percent by weight (e.g., 8 percent by weight), and a processing aid (e.g., isopropyl alcohol) in an amount from 1 percent by weight to 10 percent by weight (e.g., 3 percent by weight).

Other embodiments of glue compositions use microencapsulated tackifiers, and include a metallocene-catalyzed polyolefin wax in an amount from 25 to 35 percent by weight (e.g., about 29 percent by weight), one or more hydrogenated resin tackifiers in an amount from 20 to 35 percent by weight (e.g., 28 percent by weight), one or more lubricants in an amount from 5 to 20 percent by weight (e.g., 15 percent by weight), one or more plasticizers in an amount from 5 to 15 percent by weight (e.g., 9 percent by weight), a slip agent in an amount from 1 to 5 percent by weight (e.g., 1 percent by weight), a the moisture-curing acetoxy silicone adhesive in an amount from 1 to 10 percent by weight (e.g., 3 percent by weight), a reinforcing material in an amount from 1 to 10 percent by weight (e.g., 2 percent by weight), and the microencapsulated tackifier in an amount from 5 to 20 percent by weight (e.g., 12 percent by weight). For example, the microencapsulated tackifier may contain mineral oil or a suitable alternative in an amount from 10 to 30 percent by weight of the encapsulated composition (e.g., about 20 percent by weight) and a tackifier, such as a hydrogenated resin tackifier, in an amount from 70 to 90 percent by weight of the encapsulated composition (e.g., about 80 percent by weight), with a total solids percentage of from 50 to 80 percent (e.g., 71 percent).

Another embodiment of a glue composition using a microencapsulated tackifier includes a metallocene-catalyzed polyolefin wax in an amount from 25 to 35 percent by weight (e.g., about 30 percent by weight), one or more hydrogenated resin tackifiers in an amount from 20 to 35 percent by weight (e.g., 29 percent by weight), one or more lubricants in an amount from 5 to 20 percent by weight (e.g., 10 percent by weight), one or more plasticizers in an amount from 5 to 15 percent by weight (e.g., 10 percent by weight), a slip agent in an amount from 1 to 5 percent by weight (e.g., 2 percent by weight), a moisture-curing acetoxy silicone adhesive in an amount from 1 to 10 percent by weight (e.g., 7 percent by weight), a reinforcing material (e.g., filler) in an amount from 1 to 10 percent by weight (e.g., 2 percent by weight), and the microencapsulated tackifier in an amount from 5 to 20 percent by weight (e.g., 12 percent by weight). For example, the microencapsulated tackifier may contain mineral oil or a suitable alternative in an amount from 10 to 30 percent by weight of the encapsulated composition (e.g., about 20 percent by weight) and a tackifier, such as a hydrogenated resin tackifier, in an amount from 70 to 90 percent by weight of the encapsulated composition (e.g., about 80 percent by weight), with a total solids percentage of from 40 to 60 percent (e.g., 55 percent).

Methods for Making Glue Compositions

Methods for making the glue compositions described herein are also provided. In certain embodiments, a method includes combining a metallocene-catalyzed polyolefin wax and a tackifier in a vessel, heating the vessel to a temperature of from about 100° C. to about 150° C. and mixing to form a homogenous mixture, and pouring the homogenous mixture into a mold and allowing it to cool to form a glue composition. These methods may be used to produce glue compositions having any of the ingredients, combinations of ingredients, and/or properties described herein.

For example, in some embodiments the glue composition includes the metallocene-catalyzed polyolefin wax in an amount of at least 25 percent, by weight of the composition, and the tackifier in an amount of at least 20 percent, by weight of the composition, and the glue composition is solid at room temperature and is configured to provide an adhesive layer onto a substrate upon abrasion thereagainst.

The ingredients may be combined in one or more mixing steps to achieve the homogenous mixture. For example, the wax, at least one tackifier, a plasticizer, a slip agent, and/or a lubricant may be combined in a mixing vessel and heated to a temperature of from about 100° C. to about 150° C. (e.g., from 120° C. to 150° C., or from 130° C. to 140° C.), while mixed to form a homogenous mixture. The mineral oil, additional tackifiers, adhesives/sealants, and lubricants may optionally be added to the composition in the initial or separate mixing steps. For example, a solution of polyvinylpyrrolidone polymer (e.g., dissolved in isopropyl alcohol) may be added to the vessel and mixed with the composition such that the temperature of the vessel evaporates the solvent from the mixture. The heated homogenous mixture may be poured into the desired mold and cooled or allowed to cool to form a solid glue product (e.g., an elongated glue stick). Advantageously, such methods produce glue products that are solid at room temperature and which do not require a moisture-resistant container or cover.

Examples

Seven sample glue formulations were prepared according to the present disclosure and tested for application and adhesion properties. Table 1 shows the ingredients used, and corresponding weight percentages, of each of the seven glue composition formulas.

For example, Formula 2 was prepared according to the following method: (1) the LICOCENE 1602, SUKOREZ SU-100, BENZOFLEX 352, STAYBELITE Resin E, PICCOLASTIC A75, stearic acid, calcium stearate, glycerol monostearate, and stearyl alcohol were combined in a mixing vessel, (2) the vessel was heated to 135° C. and the raw materials were mixed to form a homogeneous mixture, (3) the RENOIL 220 was added to the mixing vessel and the composition was mixed to form a homogenous mixture, (4) the KOBOGUARD 5400 was added to the mixing vessel and the composition was mixed to form a homogenous mixture, (5) a 55-60% solution of PVP K-30dissolved in isopropyl alcohol (IPA) was prepared and added into the mixing vessel and the composition was mixed (temperature of the vessel maintained) to evaporate the IPA from the composition, (6) the moisture-curing acetoxy silicone adhesive was added to the mixing vessel and the composition was mixed for 3-5 minutes to form a homogenous mixture, and (7) immediately thereafter, the homogenous mixture was poured into a mold and allowed to cool.

Each of the sample formulations in Table 1 were observed to provide sufficient paper-bonding tack/adhesion and application properties. In particular, Formula 1, which contained a relatively high amount of the moisture-curing acetoxy silicone adhesive, was observed to remove the protected portion formed by the silicone adhesive upon application of the glue stick, allowing the inherent tackiness of the composition to provide good initial paper-bonding tack and a final cure over time from the moisture-curing portion of the glue stick. Additionally, the glue sticks formed using the silicone adhesive were found to reduce the bonding of separate glue sticks to one another.

When PVP was incorporated into a 100% solids glue composition, in Formula 2, it provided improved paper adhesion.

Glue compositions that did not contain an encapsulated moisture-curing adhesive or sealant also performed well by providing a finished product that can be applied to a piece of paper and provide adequate bonding strength. Use of a thermoplastic SBR rubber when incorporated with the various tackifiers, in Formula 3, provided good adhesion when bonding lightweight articles together.

Glue compositions without a thermoplastic rubber were also found to provide an acceptable glue composition when suitable tackifiers are used in combination with the metallocene polymer as shown in Formula 4.

Glue compositions not containing a moisture-curing adhesive/sealant or a liquid styrene-butadiene elastomer were also effectively made by employing a polyvinylpyrrolidone polymer as shown in Formula 5.

It was further discovered that the ease of application for a glue composition could be improved using microencapsulation technology. Although removal of a tackifier will improve the drag resistance of the glue stick, it also eliminates the required paper bonding characteristics desired for the product. Encapsulation of the tackifier(s) and inclusion in the glue formulation eliminates some of the drag resistance of the finished product. When the glue composition is applied to a paper surface, the shell of the encapsulated tackifier will rupture, thus providing tack on demand. It was found that a combination of mineral oil plus tackifier could be encapsulated for use in a glue composition. Deodorized kerosene or isododecane are other diluent examples as potential replacements for the mineral oil. Other combinations are available as well. Representative formulas are shown in Formulas 6 and 7.

TABLE 1

Weight Percentages of Ingredients in Sample Glue Compositions

| Ingredient | Sample Formula 1 | Sample Formula 2 | Sample Formula 3 | Sample Formula 4 | Sample Formula 5 | Sample Formula 6 | Sample Formula 7 |
|---|---|---|---|---|---|---|---|
| LICOCENE 1602 | 29.68 | 29.25 | 28.10 | 35.30 | 29.19 | 28.50 | 29.70 |
| SUKOREZ SU-100 | 24.64 | 24.22 | 26.00 | 32.60 | 24.17 | 23.50 | 24.60 |
| BENZOFLEX 352 | 5.49 | 5.31 | 5.50 | 6.52 | 5.31 | 5.40 | 5.40 |
| STAYBELITE Resin E | 4.10 | 4.03 | 5.90 | 4.91 | 4.03 | 5.40 | 4.10 |
| PICCOLASTIC A75 | 4.10 | 4.03 | 1.00 | 4.91 | 4.03 | 4.00 | 4.10 |
| Stearic Acid | 10.32 | 10.14 | 5.00 | 4.35 | 10.19 | 4.00 | 7.88 |
| RENOIL 220 | 2.72 | 2.65 | 3.90 | 3.26 | 2.65 | | |
| KOBOGUARD 5400 | 5.04 | 5.21 | | 5.97 | 5.21 | | |
| Calcium Stearate | 0.90 | 0.88 | | 1.09 | 0.88 | 10.00 | 0.90 |
| Glycerol monostearate | 0.90 | 0.88 | | 1.09 | 0.88 | 0.90 | 0.70 |
| Stearyl Alcohol | 2.03 | 1.96 | | | 1.96 | 0.90 | 2.00 |
| Moisture-Curing Acetoxy Silicone Adhesive | 10.08 | 3.08 | | | | 3.2 | 6.62 |
| PVP K-30 | | 8.36 | | | 8.36 | | |
| NUROZ RE85E | | | 13.70 | | | | |
| SYLVALITE RE-100 | | | 5.90 | | | | |
| L-SBR-820 | | | 5.00 | | | | |
| Isopropyl alcohol | | | | | 3.14 | | |
| Calcium Carbonate | | | | | | 2.00 | 2.00 |
| TINUVIN 328 | | | | | | 0.10 | 0.10 |
| IRGANOX 1010 | | | | | | 0.10 | 0.10 |
| Microencapsulated Tackifier (20% Mineral Oil + 80% KOBOGUARD 5400; 71% total solids) | | | | | | 12.00 | |
| Microencapsulated Tackifier (20% Mineral Oil + 80% KOBOGUARD 5400; 55% total solids) | | | | | | | 11.80 |
| Total | 100 | 100 | 100 | 100 | 100 | 100 | 100 |

Thus, glue compositions that are solid at room temperature, fast-drying, and which do not require a moisture-resistant container or cover were successfully manufactured. Such glue compositions may be used to form glue sticks or "glue crayons" that do not require heat for their application other than the heat produced from the friction between the glue composition and a substrate against which the composition is abraded or applied. For example, the mold in which the glue composition is set may be sized and shaped to make the glue composition into a form of one or more crayons. For example, a glue crayon may have an elongated shape with a circular, elliptical, rectangular, or other shaped crosssection. Such glue compositions advantageously may be packaged without a moisture-resistant container or cover and may provide a fast-drying glue that does not wrinkle or damage paper or other delicate substrates.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A glue composition, comprising:
  a metallocene-catalyzed polyolefin wax present in an amount of at least 25 percent, by weight of the composition;
  a tackifier present in an amount of at least 20 percent, by weight of the composition;
  a mineral oil;
  a plasticizer; and
  a lubricant,
  wherein the glue composition contains no water,
  wherein the glue composition is solid at room temperature and is configured to provide an adhesive layer onto a substrate upon abrasion thereagainst, and
  wherein the tackifier and the mineral oil are encapsulated, such that an encapsulated composition comprises the mineral oil in an amount of from 5 percent to 30 percent, by weight of the encapsulated composition, and the tackifier in an amount of from 70 percent to 95 percent, by weight of the encapsulated composition.

2. The glue composition of claim 1, wherein the metallocene-catalyzed polyolefin wax comprises a metallocene-catalyzed polypropylene wax.

3. The glue composition of claim 1, wherein the metallocene-catalyzed polyolefin wax comprises an amorphous metallocene propylene-ethylene-copolymer wax.

4. The glue composition of claim 1, wherein the tackifier comprises a hydrogenated resin tackifier, a rosin ester tackifier, or a combination thereof.

5. The glue composition of claim 4, wherein the tackifier comprises a hydrogenated dicyclopentadiene hydrocarbon resin, a hydrogenated polycyclopentadiene resin, a glycerol rosin ester, a pentaerythritol rosin ester, or a combination thereof.

6. The glue composition of claim 1, wherein the lubricant comprises stearic acid, calcium stearate, glycerol monostearate, or a combination thereof.

7. The glue composition of claim 1, wherein the encapsulated composition comprises at least 50 percent solids, by weight of the encapsulated composition.

8. The glue composition of claim 1, further comprising a moisture-curing elastomer adhesive or sealant, a thermoplastic styrene-butadiene rubber, a polyvinylpyrrolidone polymer, or a combination thereof.

9. The glue composition of claim 8, wherein the moisture-curing elastomer adhesive or sealant comprises a moisture-curing acetoxy silicone adhesive.

10. The glue composition of claim 1, wherein the glue composition contains no solvents.

11. The glue composition of claim 1, wherein the glue composition contains 100 percent solids.

12. The glue composition of claim 1, wherein the glue composition comprises at least one thermochromic material.

13. The glue composition of claim 1, wherein the composition is in the form of a crayon.

14. A method of making a glue composition, comprising:
  combining a metallocene-catalyzed polyolefin wax, a plasticizer, a lubricant, and an encapsulated composition in a vessel, wherein the encapsulated composition comprises mineral oil in an amount of from 5 percent to 30 percent, by weight of the encapsulated composition, and a tackifier in an amount of from 70 percent to 95 percent, by weight of the encapsulated composition;
  heating the vessel to a temperature of from about 100° C. to about 150° C. and mixing to form a homogenous mixture; and
  pouring the homogenous mixture into a mold and allowing it to cool to form a glue composition comprising the metallocene-catalyzed polyolefin wax in an amount of at least 25 percent, by weight of the composition, and the tackifier in an amount of at least 20 percent, by weight of the composition,
  wherein the glue composition contains no water, is solid at room temperature and is configured to provide an adhesive layer onto a surface upon abrasion thereagainst.

15. The method of claim 14, further comprising combining at least one additive selected from a group consisting of plasticizers, lubricants, and mineral oils with the metallocene-catalyzed polyolefin wax and tackifier to form the homogenous mixture.

16. The method of claim 14, further comprising combining a moisture-curing elastomer adhesive or sealant, a thermoplastic styrene-butadiene rubber, a polyvinylpyrrolidone polymer, or a combination thereof with the metallocene-catalyzed polyolefin wax and tackifier to form the homogenous mixture.

17. The method of claim 14, further comprising combining a solution comprising polyvinylpyrrolidone polymer in a solvent with the metallocene-catalyzed polyolefin wax and tackifier and allowing the solvent to evaporate, to form the homogenous mixture.

18. The method of claim 14, wherein the glue composition contains no solvents.

19. The method of claim 14, wherein the glue composition contains 100 percent solids.

20. The method of claim 14, wherein the mold is sized and shaped to make the glue composition into a form of one or more crayons.

21. The glue composition of claim 1, wherein the glue composition does not require a moisture-resistant container or cover to maintain its configuration to provide an adhesive layer onto a substrate upon abrasion throughout.

22. The method of claim 14, wherein the glue composition does not require a moisture-resistant container or cover to maintain its configuration to provide an adhesive layer onto a substrate upon abrasion throughout.

* * * * *